July 2, 1940.   H. L. BARTER ET AL   2,206,443
APPARATUS FOR FORMING TOOTHED ELEMENTS
Filed Oct. 11, 1935   4 Sheets-Sheet 1

July 2, 1940.  H. L. BARTER ET AL  2,206,443
APPARATUS FOR FORMING TOOTHED ELEMENTS
Filed Oct. 11, 1935  4 Sheets-Sheet 2

July 2, 1940.  H. L. BARTER ET AL  2,206,443
APPARATUS FOR FORMING TOOTHED ELEMENTS
Filed Oct. 11, 1935  4 Sheets-Sheet 3

July 2, 1940. H. L. BARTER ET AL 2,206,443
APPARATUS FOR FORMING TOOTHED ELEMENTS
Filed Oct. 11, 1935 4 Sheets-Sheet 4

Inventor
J. M. Christman
& Harry L. Barter
By Watson, Cole, Moree
& Trindle Attorney Patented July 2, 1940

2,206,443

UNITED STATES PATENT OFFICE 2,206,443

APPARATUS FOR FORMING TOOTHED ELEMENTS

Harry L. Barter and John M. Christman, Detroit, Mich., assignors to Packard Motor Car Company, Detroit, Mich., a corporation of Michigan Application October 11, 1935, Serial No. 44,629

12 Claims. (Cl. 90—1)

This invention relates to a gear forming and finishing machine and has for its object the provision of a machine of this character which is simple to construct and operate and which will rapidly and efficiently cut or otherwise form gear teeth in a blank and chamfer the edges of gear teeth or remove the burrs at the intersection of the working surfaces of the teeth with the end faces thereof and at the outer ends of the teeth. The invention also contemplates the provision of a new and improved method of forming and chamfering gear teeth.

The chamfering of gears, commonly done by hand by means of a file, not only serves to prevent the breaking off during use of the gears of small particles of metal, which is obviously highly objectionable in the event the gears are used in an automobile transmission or other closed lubricated housing, but in the case of gears which are axially shiftable into and out of mesh, such as starter gears or gears employed in change speed transmissions, the meshing of the gears is facilitated by the provision of cooperating chamfered or beveled edges.

It has been heretofore proposed to provide machines for effecting the chamfering of gears to replace the hand chamfering commonly employed, but these machines rely for the most part on a cutting operation which is difficult to execute with accuracy and which is likely to leave burrs or rough edges on the teeth which are equally as objectionable as the original burrs on the freshly cut gear teeth. It is proposed as a part of the present invention to eliminate these difficulties and to effect chamfering of the teeth by deformation of each tooth by the application of pressure thereto before the gear is hardened. If desired, the material displaced as the result of such deformation may be removed by grinding or cutting, but under some circumstances this step may be eliminated.

In a more specific aspect thereof, the invention contemplates the rolling of an unhardened gear to be chamfered with a hardened toothed element, the latter having the end portions of the teeth thereof deformed, whereby corresponding deformation of the end portions of the teeth of the unhardened gear may be effected to provide the desired chamfer. Apparatus for carrying out this method preferably includes cutting means disposed adjacent the chamfered ends of the teeth for removing excess metal as it is displaced from the body of the tooth.

A gear chamfering machine of this general character is disposed in the application of John M. Christman, Serial No. 15,652, filed April 10, 1935, and the present application contemplates improvements to the Christman machine and the coordination of the operations performed by a machine of this character with the operations performed by apparatus for forming or cutting gear teeth in a blank.

Thus it is proposed by the present invention to render the chamfering and burr removing operation partly or wholly automatic, the machine for effecting the chamfering being controlled by the tooth forming or cutting apparatus. In the preferred form of the present invention a gear hobbing machine of more or less conventional design is employed, the hob being fed into the gear blank to form the teeth thereon, and the chamfering machine is responsive to the feeding movement of the hob, whereby the chamfering operation is definitely timed and requires no attention on the part of the operator once the machine has been adjusted to perform the necessary operations. It is thus possible to initiate and to terminate the chamfering and burr removing operation at predetermined instants so as to eliminate the human factor and thereby to produce gears of increased uniformity. Furthermore, the timing of the gear chamfering machine may be such that the chamfering operation will overlap to some extent the tooth cutting operation so that the total amount of time required for the production of a gear is reduced. Such overlapping of these operations would obviously be difficult to effect if the operator were relied upon to determine the precise instant at which the chamfering operation should begin.

Further objects and features of the invention will be apparent from the following description taken in connection with the accompanying drawings, in which.

For convenience in describing the invention, reference is made to the several embodiments thereof illustrated in the accompanying drawings and specific language is employed. It will nevertheless be understood that no limitation of the scope of the invention is thereby intended, but that various further modifications and alterations are contemplated such as would occur to one skilled in the art to which the invention relates.

Figure 1:
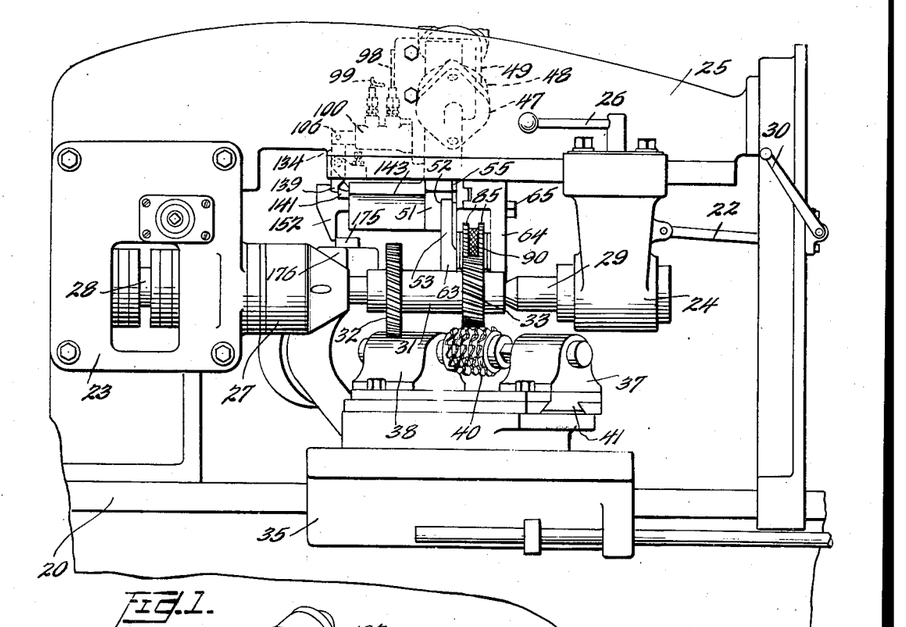
Figure 1 is a front elevation of a complete forming and finishing machine constructed in accordance with the principles of the present invention.

Referring first to Figure 1 of the drawings which discloses the principal elements of the gear forming and chamfering machine, it will be observed that the bed of the machine, indicated generally at 20, is supported on a base 21 and is provided with a head stock 23 and a tail stock 24, the latter being carried on an upper support or over-arm 25 for displacement toward and from the head stock by means of a link 22 and crank handle 30, the tail stock being locked in position by manipulation of a lever 26. A work holder or chuck 27 associated with the head stock 23 and rotated by a shaft 28 cooperates with a spindle 29 of the tail stock to support a gear blank for rotation on the axis thereof. The completed work is represented in Figure 1 as constituting a gear cluster for use in an automobile transmission, the gear cluster comprising a sleeve 31 on which are formed gears 32 and 33, the formation and chamfering of the latter gear being illustrated.

The bed 20 of the machine supports a conventional reciprocating carriage 35 on which is mounted a tool support including bearing blocks 37 and 38 in which may be rotatably mounted a cutting tool such as a hob 40, suitable means being provided for rotating the hob, the tool support and the carriage 35 being provided with cooperating guide means 41 whereby the hob may be properly positioned initially on the carriage.

The hobbing operation may be performed in the conventional manner by displacement of the carriage 35 on the bed 20 from right to left as viewed in Figure 1 whereby the hob 40 may be fed into and may traverse the portion of the gear blank on which the gear 33 is to be formed, the blank being rotated in timed relation to the reciprocating movement of the carriage and hob and the rotational speed of the hob. The details of the construction thus far described form no part of the present invention except as they may enter into combination with other elements of the machine which are hereinafter more specifically referred to.

Figures 3, 4, 5, 6, 7:
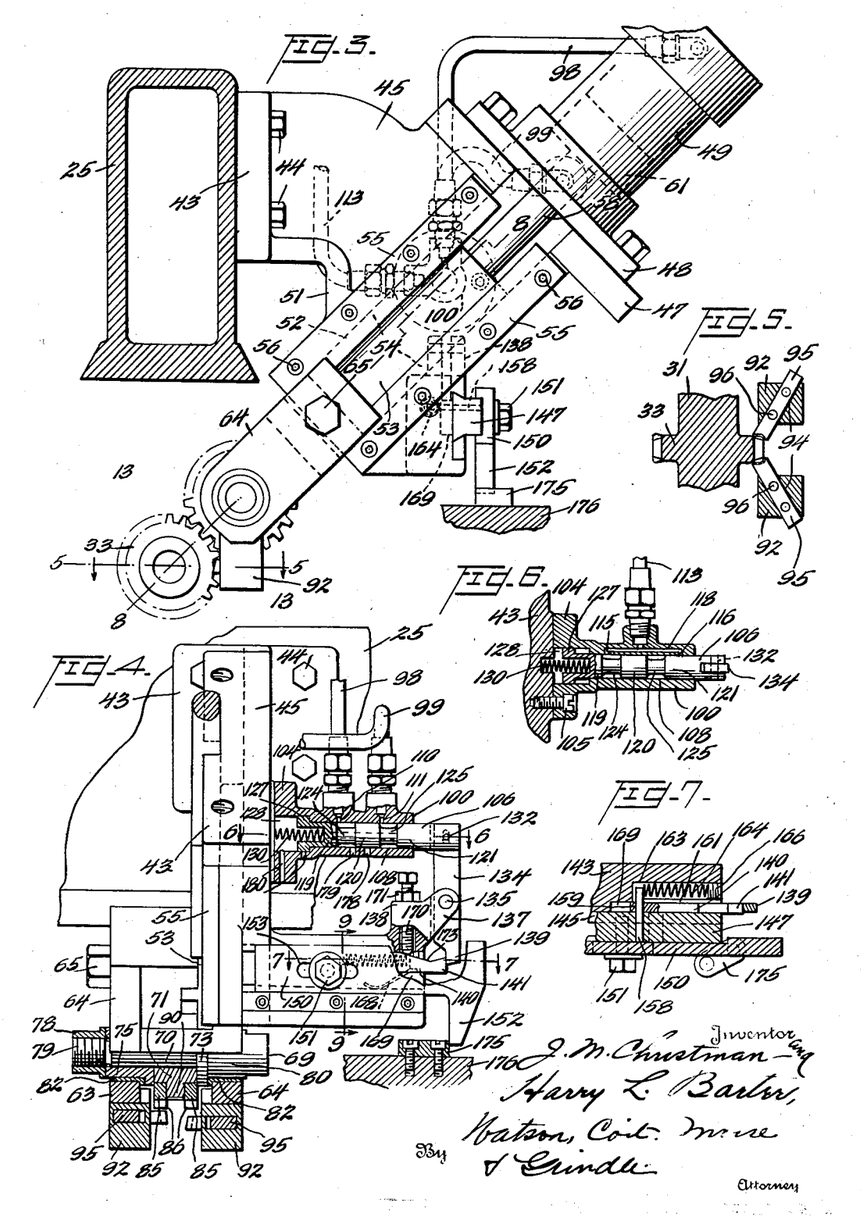
Figure 3 is a side elevation of the apparatus for effecting chamfering and burring of the gears.
Figure 4 is a front elevation, partly in section, of the apparatus shown in Figure 3.
Figure 5 is a sectional view taken substantially on the line 5—5 of Figure 3.
Figure 6 is a sectional view taken substantially on the line 6—6 of Figure 4.
Figure 7 is a section on the line 7—7 of Figure 4.

The apparatus for finishing the gear teeth by chamfering the ends thereof and removing burrs therefrom is illustrated in Figure 3 as carried by the over-arm 25 of the machine, for instance by means of a supporting bracket 43 having an arm 45 which is bolted as at 44 to the over-arm. While the supporting structure for the various moving parts of the chamfering apparatus may comprise separate elements, in the preferred form of the invention this support is afforded by the bracket 43. Thus this bracket may be provided at its upper end with a flanged portion 47 to which is secured the supporting flange 48 of a cylinder 49. The bracket 43 may also be provided with a downwardly and forwardly projecting portion 51 which is recessed as at 52 to form rectilinear guides which receive a reciprocating member 53, the cooperating guide portions 54 of the reciprocating member being retained in position by means of guide plates 55 which are secured to the guide portion 51 of the bracket 43 as indicated at 56. At its upper end the member 53 is secured to a piston rod 58, for instance by means of a threaded element 59, the piston rod extending into the lower end of the cylinder 49 and being connected therein to a piston 61 which may reciprocate in the cylinder in the conventional manner. At its lower end the member 53 is formed to provide one arm 63 of a tool support yoke, the other arm 64 of the yoke being secured to the member 53 by means of a bolt 65 extending therethrough.

The yoke arms 63 and 64 are apertured as indicated at 67 to receive a stud 69, the stud 69 having a generally cylindrical portion 70 which is adapted to receive a chamfering tool 71 which may be shrunk in position on the stud, the tool 71 engaging at one side an annular flange 73 formed on the stud, and at the other side the flange portion 74 of a collar 75 which is received on the stud and retained in position therein by means of a nut 78 threaded on the end portion 79 of the stud. The stud 69 is further provided adjacent the opposite end thereof with an enlarged cylindrical portion 80, and the portion 80 of the stud and the collar 75 are mounted for free rotation in the aligned apertures 67 of the arms 63 and 64, bushings 82 being preferably employed.

The tool 71 may be formed in one piece but is preferably constructed to afford a hub portion on the opposite ends of which are shrunk the hardened annular elements 85. The peripheral portions of the elements 85 are formed with teeth 86 which are constructed for meshing engagement with the teeth of the gear 33 which is being formed and finished.

Figures 8, 9, 10, 11, 12, 13:
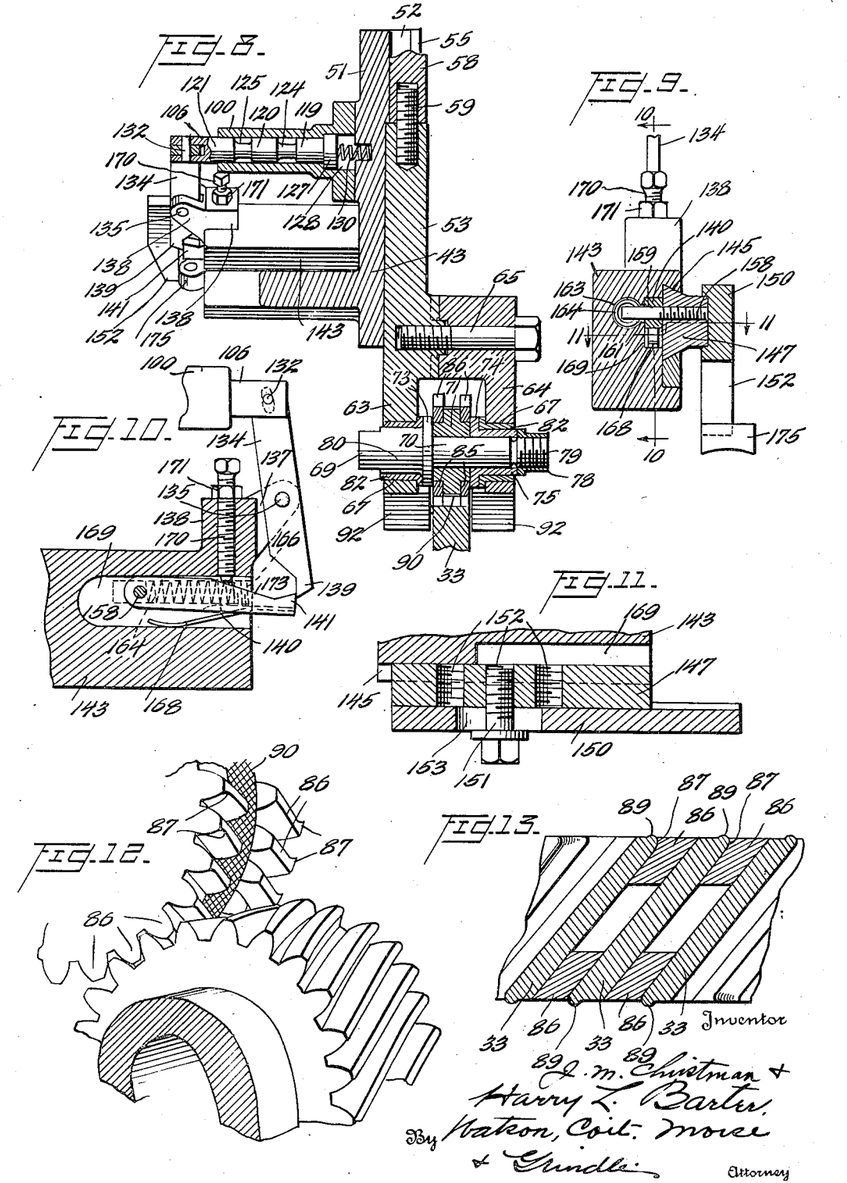
Figure 8 is a section on the line 8—8 of Figure 3.
Figure 9 is a sectional view on the line 9—9 of Figure 4.
Figure 10 is a vertical sectional view taken substantially on the line 10—10 of Figure 9.
Figure 11 is a section on the line 11—11 of Figure 9.
Figure 12 is a perspective view illustrating the manner in which the chamfering element and unhardened gear cooperate.
Figure 13 is a sectional view through the intermeshing teeth of the element and gear of Figure 12.
Figure 14:
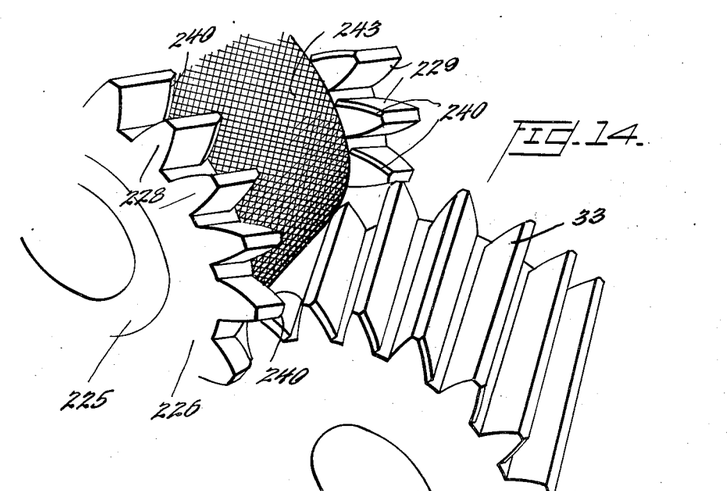
Figure 14 is a perspective view corresponding to Figure 12 and illustrating a slightly modified form of the invention.

The teeth 86 are preferably deformed to provide generally radial protuberances 87, as illustrated more particularly in Figures 12 and 13, so as to apply pressure to the opposed portions of the working faces of the teeth of the relatively soft gear 33 to deform the latter when the gear and tool are rolled together in meshing relation. The teeth of the gear 33 are thereby deformed so that the edge or arris formed by the intersection of the working faces and the ends of the gear teeth is more or less flattened. Thus these gear tooth ends are in effect chamfered, the material of which the gear teeth are formed being displaced laterally or swaged over with the resultant formation of projections 89 at the ends of the gear teeth.

The protuberances 87 on the teeth of the tool 71 are preferably formed by curving the working faces of the tool teeth, whereby the end edges of the opposed teeth of the gear 33 are rounded. Nevertheless the operation on the gear teeth is essentially one of flattening the end edges, it being appreciated that the rounded contour of the ends of the gear teeth upon completion of the operation is substantially flatter than is the initial sharply angled edge or arris formed by the cutting of the teeth in the blank. Obviously the protuberances 87 may be of different shape from that shown in the drawings, the relatively soft teeth of the gear 33 being swaged to the corresponding shape when the gear and tool are rolled together.

The hub portion of the tool 71 is illustrated as provided with an annular flange 90 disposed intermediate the annular toothed elements 85, and the peripheral portion of this flange may be roughened or knurled, the flange being of sufficient diameter to engage the central portions of the outer ends of the teeth when the tool is rolled with the gear 33. It will be observed that by reason of the difference between the diameter of the knurled portion and the effective diameters of the annular toothed elements 85 as determined by the pitch circles thereof, the knurled portion of the tool will have less linear speed than the outer ends of the teeth of the gear 33 with which it engages, and thus a scrubbing or grinding action will result to effect removal from the outer ends of the gear teeth of any rough edges or burrs which may be formed by the action of the hob 40. The removal of these burrs, both on the outer ends and on the end edges of the teeth is extremely important, it being essential, particularly in the processing of gears for use in closed lubrication systems such as are employed in the change speed gearing of automobiles, that the breaking off of fragments of the teeth and the wearing away of any burrs formed during cutting be avoided. It will also be observed that the knurled portion of the tool by engagement with the ends of the gear teeth limits the movement into the gear of the tool and thereby the extent to which the annular toothed elements 85 act in chamfering the gear teeth.

Under some circumstances it may be desired to provide chamfering teeth 86 at one side only of the tool 71 and in the event a gear having twisted or helical teeth is being formed and finished, the teeth 86 will ordinarily be arranged so as to effect chamfering of those end edges of the teeth which are more acutely angled since such edges are more likely to be formed with an initial burr by the cutting of the teeth and are much more subject to fracture in operation than are the obtuse angled edges.

In a swaging or chamfering operation such as that hereinbefore described, it is frequently desirable to remove the material displaced laterally of the teeth and forming the projections 89, particularly since these projections constitute burrs in themselves which are likely to chip off and act as an abrasive, resulting in excessive wear of the cooperating working surfaces of the teeth in an assembled gear train. This excess metal is preferably removed by a cutting operation, and for this purpose the yoke arms 63 and 64 may be provided with downwardly extending projections 92 which may be formed separately from the yoke arms and secured thereto by welding. Each of the projections 92 is slotted as indicated at 94 to receive a cutting tool 95, these cutting tools being adjustable toward or away from each other within the respective recesses 94 and being retained in position by means of set screws 96 or the like. As shown more particularly in Figure 5 of the drawings, the working ends of the tools are arranged to simultaneously engage the opposite ends of each tooth of the gear 33 as the latter rotates, one of the cutting tools 95 being preferably disposed at a slightly lower point than the other tool in the event the teeth of the gear 33 are helical or twisted, endwise pressure on the gear being thus balanced by the simultaneously applied and oppositely directed pressure exerted by the cutting tools on the opposite ends of each gear tooth.

As hereinbefore stated, the movement into and out of operative position of the chamfering tool 71 and the burring or cutting tools 95 is preferably controlled automatically and in response to relative movement of the support for the gear blank and the support for the hobbing or forming tool. Thus the member 53 is reciprocable in the guide recess 52 of the bracket 43 together with the finishing tools from the lower operative position in which the tools are shown in Figure 3 to an upper position in which the tools are spaced from the gear 33 and thereby rendered inoperative. In order to achieve this result, mechanism is provided for alternately directing a supply of air under pressure through a conduit 98 to the head or upper end of the cylinder 49 and through a conduit 99 to the lower end of the cylinder 49, this mechanism including a valve which is operable in response to the feeding movement of the hob 40. Thus a valve such as shown more particularly in Figure 6 may be provided, this valve comprising a casing 100 which is provided with a flange 104 for attachment by means of threaded elements 105 to the bracket 43. A movable valve element 106, which may be generally cylindrical in transverse section, is supported for reciprocation in a bore 108 of similar contour formed in the valve casing 100. The conduits 98 and 99 communicate respectively with the valve bore through ports 110 and 111 and a conduit 113 supplies air under pressure to the bore through ports 115 and 116, a transverse passage 118 affording communication between the latter ports. The movable element 106 of the valve is provided with generally cylindrical portions 119, 120, and 121 which have a sliding fit within the bore 108 of the valve casing 100, the element 106 being provided intermediate these cylindrical portions with reduced portions 124 and 125. At one end the valve element 106 is provided with an annular flange 127 of generally cylindrical contour which slides within a similarly shaped recess 128 at the inner end of the valve casing 100, a coil spring 130 being interposed under compression between the valve element 106 and the bracket 43 to normally urge the valve element toward the right as shown in Figure 6, the flange 127 of the valve element limiting movement of the latter in either direction. At its opposite end the valve element 106 is pivotally connected as indicated at 132, for instance by means of a pin and slot connection, with a lever 134, the lever 134 being in turn pivoted as indicated at 135 between a pair of lugs 137 extending laterally from a boss 138 formed on the bracket 43. At its lower end the lever 134 is provided with a toe portion 139 which is positioned for engagement by the toe portion 141 of a pawl 140. The bracket 43 is provided with a laterally extending projection 143 which is constructed to provide a guide recess 145 in which is slidably received a member 147. A member 150 having a depending tail 152 is adjustably secured to the member 147 by means of a bolt 151. Thus the bolt 151 may pass through an elongated slot 153 in the member 150 and through one of a plurality of apertures 155 in and spaced longitudinally of the member 147, whereby after the selection of a particular aperture 155 and the location of the bolt 151 in a selected portion of the slot 153, the bolt may be threaded firmly in position to determine the extent to which the member 150 will project to the right as viewed in Figures 4 and 11 beyond the member 147.

A pin 158 is secured in the member 147, extends through an opening 159 in the pawl 140 and through an elongated slot 161 in the projection 143 of the bracket 43 into a generally cylindrical recess 163 in the projection 143, the pawl 140 being thereby pivotally supported on the pin 158 for swinging movement in a generally vertical plane. The free end of the pin 158 abuts a coil spring 164 which lies within the recess 163 and engages at its opposite end with a plug 166 threaded in the outer end of the recess. It will be apparent that the spring 164 tends to urge the pawl 140 and the members 147 and 150 toward the left as viewed in Figures 4 and 7.

The pawl 140 is disposed within a recess 169 in the bracket projection 143, this recess being of sufficient depth to permit the toe 141 of the pawl to swing downwardly from the position in which it is shown in Figure 4 about the pivot pin 158. A flat spring 168 is secured to the lower side of the pawl 140 and engages at its lower end with the base of the recess 169, whereby the pawl 140 is normally retained in the upper position in which it is shown in Figure 4. A bolt 170 is adjustably threaded into the boss 138 of the bracket projection 143 and is secured in position by means of a lock nut 171, the bolt 170 having a rounded lower end which is arranged to engage with the upper side of the pawl 140, the upper side of the pawl being preferably inclined adjacent its outer end as indicated at 173. An abutment 175 is bolted or otherwise secured to a housing 176 which encloses a part of the driving mechanism for rotating the hob 40 and which moves with the tool support as the hob is fed into the gear 33.

The operation of the mechanism just described is substantially as follows. During the feeding of the hob into and across the gear blank to form the gear 33, and preferably immediately before the cutting of the teeth of the gear is completed, the abutment 175 engages the tail 152 on the member 150 and displaces the latter to the right as viewed in Figures 4 and 7, carrying the pawl 140 to the right and swinging the lever 134 about its point of pivotal support 135 to displace the valve element 106 to the left as viewed in Figures 4 and 6. In the position in which the valve is shown in Figure 4, displacement of the valve element 106 against the action of the spring 130 has not been initiated, and the air supply conduit 113 is in communication with the conduit 99 through the ports 116 and 111, air flowing freely around the reduced portion 125 of the valve element 106 between these ports, the vent port 178 being covered by the cylindrical portion 120 of the valve element. The piston 61 therefore occupies its upper position by reason of the admission of air under pressure to the lower end of the cylinder 49, and the chamfering and cutting mechanism connected with the piston rod 58 is disengaged from the gear 33. As the hob 40, the tool support therefor, and the carriage 35 continue their movement, the valve element 106 is displaced to the left as hereinbefore described, the port 116 is closed by passage of the cylindrical portion 121 of the valve element thereover, and the conduit 99 is vented to the atmosphere by the uncovering of the vent port 178. A similar vent port 179, which in the position of the valve element illustrated in Figure 4 serves to place the port 110 and the conduit 99 in communication with the atmosphere, is closed by this movement of the valve element, and the port 115, communicating with the air supply conduit 113, is placed in communication through the port 110 with the conduit 98, air passing about the reduced portion 124 of the valve element. Air under pressure is thereby admitted through the conduit 98 to the upper end of the cylinder 49 and the piston 61 moves downwardly to engage the chamfering tool 71 and the cutting tools 95 with the gear 33, pressure being applied to a sufficient extent to ensure proper meshing engagement of the tool teeth 86 with the teeth of the gear 33. The tool 71 is accordingly rolled on and by the gear 33 and the chamfering and burring action hereinbefore described is effected. While this operation is being performed, the tool support and the hob 40 carried thereby continue their movement and the abutment 175 effects further displacement of the member 150 and the pawl 140 toward the right as viewed in Figures 4 and 7. During this movement the inclined surface 173 of the pawl rides over the abutment constituted by the bolt 170, the pawl being thereby depressed, swinging downwardly about the pin 158 as indicated in Figure 10. This downward movement of the pawl continues until the toe 141 of the pawl clears the toe 139 of the lever 134, when the valve element 106 is released for displacement to the right as viewed in Figure 4 by the action of the spring 130, the ports 111 and 116 being thus placed in communication to supply air under pressure through the conduit 99 to the lower end of the cylinder, the upper end of the cylinder being evacuated through the conduit 98 by reason of the communication afforded between the ports 110 and 179. The member 53 and the chamfering and cutting tools carried thereby are accordingly withdrawn from engagement with the gear 33 into the inoperative position.

The operation of forming and finishing the gear 33 is now completed, the gear may be removed from the machine, and the carriage 35, the tool support, and the hob 40 may be displaced toward the right as viewed in Figure 1 in readiness for operation on another gear, the coil spring 164 effecting return of the member 150 and the pawl 140 to the positions in which they are shown in Figure 4. In order to prevent retardation of the movement of the valve element 106, vent passages 180 may be provided in the valve casing 100 for communication with either side of the flange 127 of the valve element.

It will be appreciated that the instants at which air is admitted to either end of the cylinder 49 may be varied over fairly wide limits but that it is possible to accurately predetermine the period of engagement of the chamfering tool with the gear being finished by proper regulation of the elements of the controlling mechanism. Thus as hereinbefore explained, the member 150 may be displaced either to the right or to the left as viewed in Figure 4 to vary the time of initiation of the chamfering operation. Similarly the bolt 170 may be threaded into or out of the boss 133 to vary the instant at which the toe 141 of the pawl 140 will be released from the toe 139 of the lever 134, and accordingly the instant at which the chamfering tool is withdrawn from the gear and the operation terminated.

Returning now to Figure 2 of the drawings, which illustrates gearing suitable for operation of the several movable parts of the machine, it will be observed that the source of power is constituted by a motor 182 which is connected through spur gearing 183 with a shaft 184. Worm gearing 185 interposed between the shaft 184 and the shaft 28 serves to rotate the latter at a reduced rate of speed, the shaft 28 driving the chuck which carries the gear cluster to be finished, this cluster comprising the gears 32 and 33.

Figure 2:
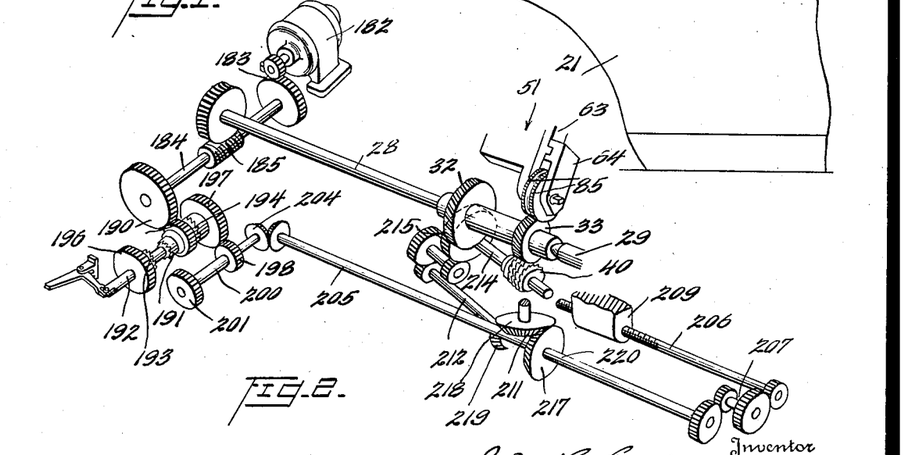
Figure 2 is a diagrammatic view of a train of gearing which may be employed to drive the component parts of the machine shown in Figure 1.

The shaft 184 is also operatively connected through spur gears 190, which are continuously in meshing relation, with a double clutch element 191, a shaft 192 extending through the clutch element for sliding movement therein. The shaft 192 carries clutch elements 193 and 194 which are positioned for selective engagement with the double clutch element 191 to effect coupling of either of the spur gears 196 and 197 with the intermeshing gears 190. When the shaft 192 is displaced in one direction to render the gear 197 operative, the latter is moved into engagement with a cooperating spur gear 198 on a shaft 200. When the shaft 192 is moved in the opposite direction to render the gear 196 operative, the latter is concurrently moved into meshing engagement with a second cooperating spur gear 201 of larger diameter on the shaft 200. The arrangement thus provides for the selection of two different speed ratios for driving the shaft 200. Other types of change speed gearing may of course be substituted for that illustrated.

The shaft 200 is operatively connected through beveled gearing 204 with a shaft 205, the latter being operatively connected with the lead screw 206 through a train of spur gearing indicated generally at 207. A nut 209 engaging the lead screw 206 serves to effect displacement of the carriage 35 on the bed and thereby to feed the hob 40 into and across the gear blank.

The shaft 205 is also connected through a train of beveled gearing 211 with a shaft 212 which in turn drives a shaft 214 through a spur gear reducing train 215, the shaft 214 serving as a support on which the hob 40 is mounted.

The beveled gearing 211, comprising a driving gear 217, an idler gear 218, and a driven gear 219, and the spur gearing train 215 which couples the shaft 212 to the hob 40 are all carried by and movable with the carriage 35, the gear 217 having a splined connection 220 with the shaft 205. In this manner displacement of the carriage and the hob during feeding of the latter is permitted without interrupting the driving train. The hob 40 is similarly splined on the shaft 214 whereby adjustment of the bearing blocks 37 on the carriage 35 in the direction of the hob axis to correctly position the hob may be effected. It will be appreciated that the detailed construction of this gearing forms no part of the present invention, it being only necessary to ensure the proper timed relation between the rotational movement of the hob on its own axis, the translational movement of the hob, and the rotational movement of the gear 33 during the hobbing operation.

Figures 14 to 17 inclusive illustrate a modified form of tool which is in some respects an improvement on that heretofore described although functioning in a generally similar manner. As shown more particularly in Figure 17 the tool may be mounted on the cylindrical portion 70 of the stud 69 and is retained in position thereon by the collar 75 as in the construction heretofore described. The hub portion 225 of the tool receives hardened annular elements 226 and 227 which are provided with toothed peripheral portions as indicated at 228 and 229. One of the annular elements, for instance the element 226, is secured on the hub 225 of the tool against rotation with respect thereto, for instance by means of a key 230. The other annular element 227 is supported on the hub 225 for rotative adjustment with respect thereto. The means for effecting this adjustment may assume various forms and the details thereof form no essential part of the present invention.

Figures 15, 16, 17:
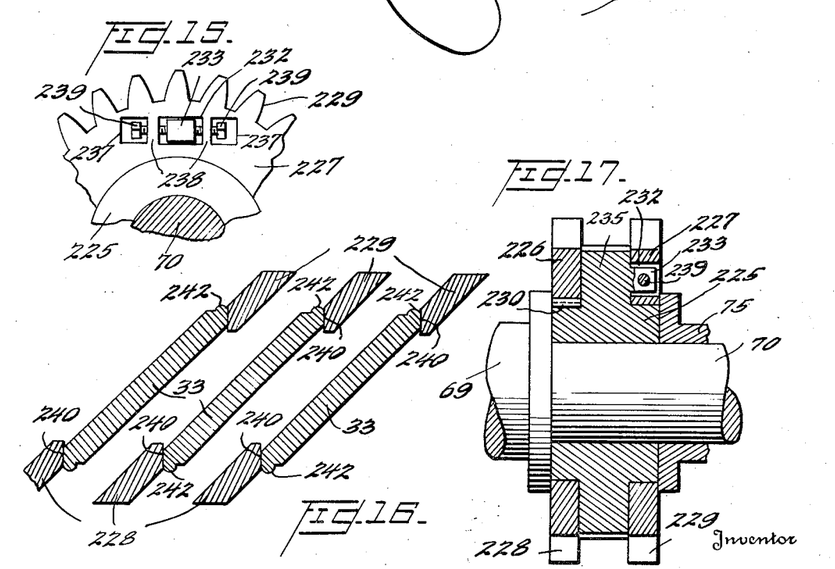
Figure 15 is a fragmentary view in end elevation of the chamfering element shown in Figure 14.
Figure 16 is a sectional view corresponding to that shown in Figure 13 but illustrating the mode of cooperation of the modified form of chamfering element and unhardened gear shown in Figure 14.
Figure 17 is a sectional view through the axis of the chamfering element shown in Figure 14.

For example, the element 227 may be apertured as indicated at 232 and an axially directed lug 233 formed on the radially extending portion 235 of the hub 225 may extend outwardly into the aperture 232. The element 227 may be further recessed as indicated at 237 at points on each side of and spaced from the aperture 232, leaving the axially directed ribs 238 which are threaded to receive bolts 239, the heads of these bolts lying within the recesses 237 and being accessible with a tool, and the ends of the bolts engaging the lug 233. It is apparent that by adjustment of the bolts 239, the annular element 227 may be rotatively or angularly adjusted on the hub 225 of the tool and securely retained in any desired position of adjustment.

The teeth formed on the peripheral portions 228 and 229 of the annular elements are arranged to engage with the ends of the teeth of the gear 33, but are not constructed for meshing engagement with the latter, the nature of the engagement being illustrated more particularly in Figure 16. Thus each of the tool teeth are bevelled or chamfered as indicated at 240 so as to engage and apply generally circumferential pressure to the opposite ends of the teeth of the gear 33 as the tool and the gear are rotated together in operative relation, and the acute angled portions at the ends of the gear teeth are deformed and flattened, metal being displaced laterally with resultant formation of projections 242 at the ends of the gear teeth which may be removed by cutting elements such as shown more particularly in Figure 5. In general the working surfaces 240 of the tool teeth are substantially flat and define planes approximately normal to the pitch circles of the toothed portions. The thickness of the teeth of the toothed portions is substantially less than the spaces between adjacent gear teeth so that the desired adjustment can be effected without difficulty.

It will be observed that the extent to which deformation or flattening of the gear teeth ends is carried out may be varied in this form of the invention by relative rotative adjustment of the annular elements 227 and 226 and the shape of the finished gear teeth may thereby be controlled in accordance with the purpose for which the gear is to be subsequently used. It will of course be understood that the radially extending portion 235 of the tool hub may be knurled as indicated at 243, this knurled portion serving to remove any burrs from the outer ends of the teeth of the gear 33 and to limit the extent to which the tool is moved toward and into operative engagement with the gear. It is apparent that with this form of construction careful cutting of the toothed portions of the tool to establish proper meshing relation with the gear is unncessary and the expense of producing the tool may be correspondingly reduced. Furthermore, as wear occurs the two toothed elements of the tool may be relatively adjusted to the extent necessary to ensure correct chamfering of the gear teeth.

It will be understood that the present invention contemplates broadly the application of a timing device to a machine for chamfering gears. While the chamfering machine and timing device are preferably associated with a gear forming or cutting apparatus and are controlled in timed relation with the cutting operation, it is conceivable that under some circumstances a distinctly different type of gear forming device may be employed and that such gear forming device may function wholly independently of the chamfering machine and the timing device therefor. Furthermore, while the form of chamfering and burr removing tools herein illustrated comprise the preferred form of the invention, substitution of other types of tools may be effected. Various other alterations and modifications of the arrangement shown herein are contemplated such as may fall within the spirit and scope of the appended claims.

Having thus described the invention, what is claimed as new and desired to be secured by Letters Patent is:

1. In apparatus for forming and finishing gears, the combination with means supporting a gear blank for rotation, of means supported for engagement with said blank for forming gear teeth therein, means supported for displacement from an inoperative position to an operative position in engagement with said teeth for chamfering end faces thereof, and mechanism operable automatically in timed relation with said tooth forming means and during a portion of the tooth cutting operation for effecting displacement of said chamfering means to operative position.

2. In apparatus for forming and finishing gears, the combination with means supporting a gear blank for rotation, of means supported for engagement with said blank for forming gear teeth therein, means supported for displacement from an inoperative position to an operative position in engagement with said teeth for chamfering end faces thereof, and mechanism operable automatically in timed relation with said tooth forming means and during a portion of the tooth cutting operation for effective displacement of said chamfering means to operative position, and for thereafter effecting displacement of said chamfering means to inoperative position.

3. In apparatus for forming and finishing gears, the combination with a support for a gear blank, of a tooth forming tool, a support for said tool, means for effecting relative displacement of said supports to feed said tool against said blank, and means for effecting chamfering of the ends of certain of the teeth during a portion of the tooth cutting operation, said last named means being controlled by relative displacement of said supports.

4. In apparatus for forming and finishing gears, the combination with a support for a gear blank, of a tooth forming tool, a support for said tool, means for effecting relative displacement of said supports to feed said tool against said blank, means for effecting chamfering of the ends of certain of the teeth during a portion of the tooth cutting operation, and mechanism operable by relative displacement of said supports for initiating and terminating operation of said chamfering means.

5. In apparatus for forming and finishing gears, the combination with a support for a gear blank, of a tooth forming tool, a support for said tool, means for effecting relative displacement of said supports to feed said tool against said blank, means for effecting chamfering of tooth ends mounted for displacement between an inoperative position and an operative position in engagement with said blank, and mechanism operable by displacement of said supports for effecting displacement of said chamfering means to operative position while said tool is in tooth forming relation with said blank.

6. In apparatus for forming and finishing gears, the combination with a support for a gear blank, of hobbing means for cutting teeth in said blank, a support for said hobbing means, means for effecting relative displacement of said supports to feed said hobbing means against said blank, chamfering and burr removing means supported for displacement into an operative position in engagement with said blank, and mechanism for effecting displacement of said last named means into operative position while said hobbing means is in cutting position and during hobbing of said blank.

7. In apparatus for forming and finishing gears, the combination with a support for a gear blank, of hobbing means for cutting teeth in said blank, a support for said hobbing means, means for effecting relative displacement of said supports to feed said hobbing means against said blank, chamfering and burr removing means supported for displacement into an operative position in engagement with said blank, and mechanism for effecting displacement of said last named means into operative position while said hobbing means is in operative position and during hobbing of said blank, said mechanism being operable in response to relative movement of said supports.

8. In apparatus for forming and finishing gears, the combination with a support for a gear blank, of hobbing means for cutting teeth in said blank, a support for said hobbing means, means for effecting relative displacement of said supports to feed said hobbing means against said blank, chamfering and burr removing means supported for displacement into an operative position in engagement with said blank, and mechanism for effecting displacement of said last named means into operative position while said hobbing means is in operative position and during hobbing of said blank and into an inoperative position after completion of the hobbing operation, said mechanism being rendered operable by relative movement of said supports.

9. In apparatus for forming and finishing gears, the combination with means supporting a gear blank for rotation, of means supported for engagement with said blank for forming gear teeth therein, means supported for displacement from an inoperative position to an operative position in engagement with said teeth for chamfering end faces thereof, mechanism operable automatically in timed relation with said tooth forming means for effecting displacement of said chamfering means to operative position while said tooth forming means are in cutting engagement with said blank, and an adjustable device for controlling the initiation of operation of said mechanism to vary said timed relation.

10. In apparatus for forming and finishing gears, the combination with means supporting a gear blank for rotation, of means supported for engagement with said blank for forming gear teeth therein, means supported for displacement from an inoperative position to an operative position in engagement with said teeth for chamfering end faces thereof, mechanism operable automatically in timed relation with said tooth forming means for effecting displacement of said chamfering means to operative position while said tooth forming means are in cutting engagement with said blank, and for thereafter effecting displacement of said chamfering means to inoperative position, and means for effecting adjustment of said mechanism to independently vary the instant of displacement of said chamfering means to operative position and from operative position.

11. In apparatus for forming and finishing gears, the combination with a support for a gear blank, of a tooth forming tool, a support for said tool, means for effecting relative displacement of said supports to feed said tool against said blank, means for effecting chamfering of tooth ends, mechanism operable by relative displacement of said supports for initiating and terminating operation of said chamfering means, and manually adjustable means associated with said mechanism to independently vary the instants of initiation and termination of operation of said chamfering means with reference to the extent of relative displacement of said supports.

12. In apparatus for forming and finishing gears, the combination with means supporting a gear blank, of means supported for engagement with said blank for forming gear teeth therein, means supported for displacement from an inoperative position to an operative position in engagement with said teeth for chamfering end faces thereof, and mechanism for effecting displacement of said chamfering means into operative position in engagement with said teeth and for continuously and concurrently maintaining engagement of both said chamfering means and said forming means with said blank during at least a part of the tooth forming operation.

HARRY L. BARTER.
JOHN M. CHRISTMAN.